Patented June 16, 1942

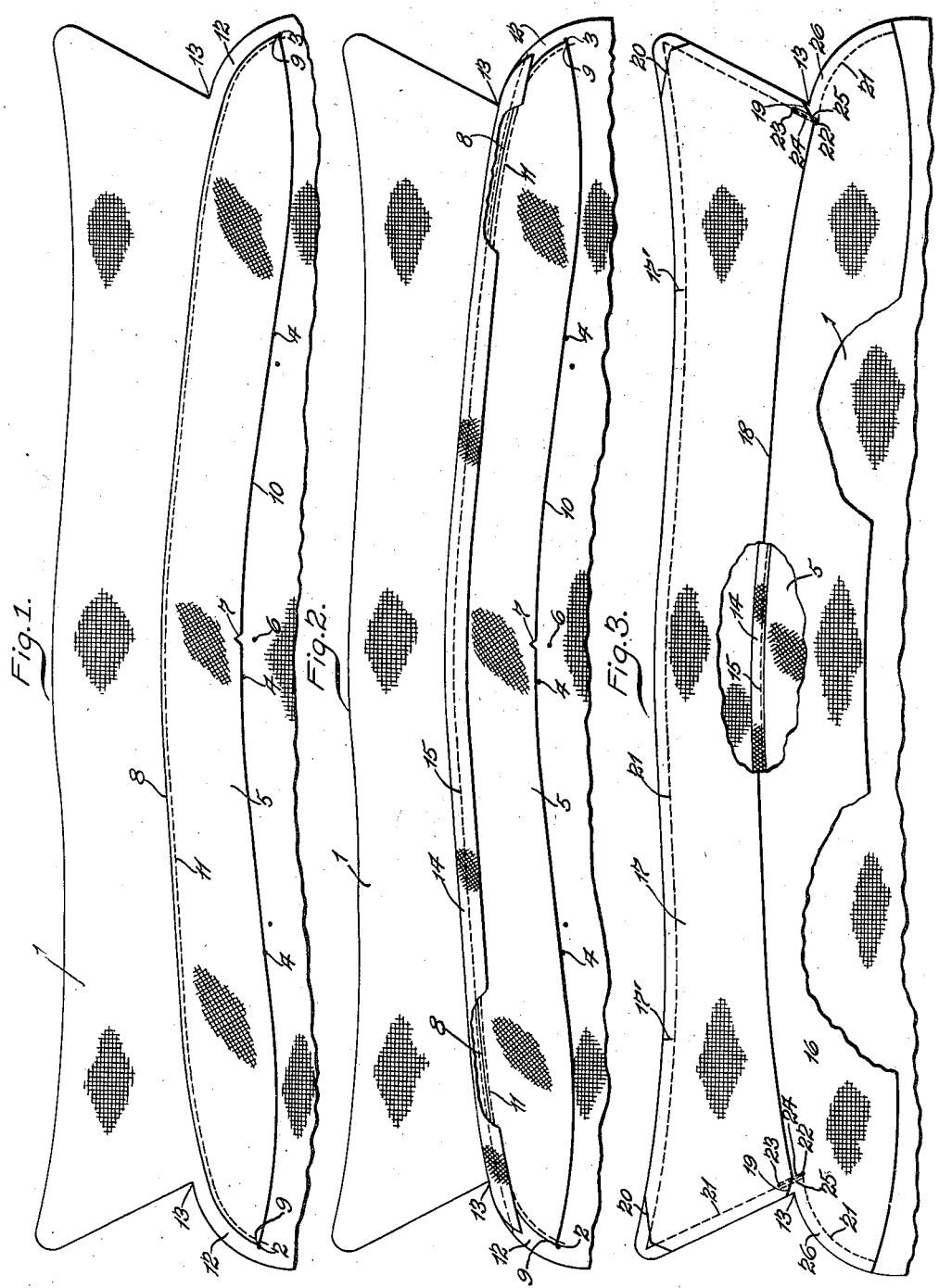

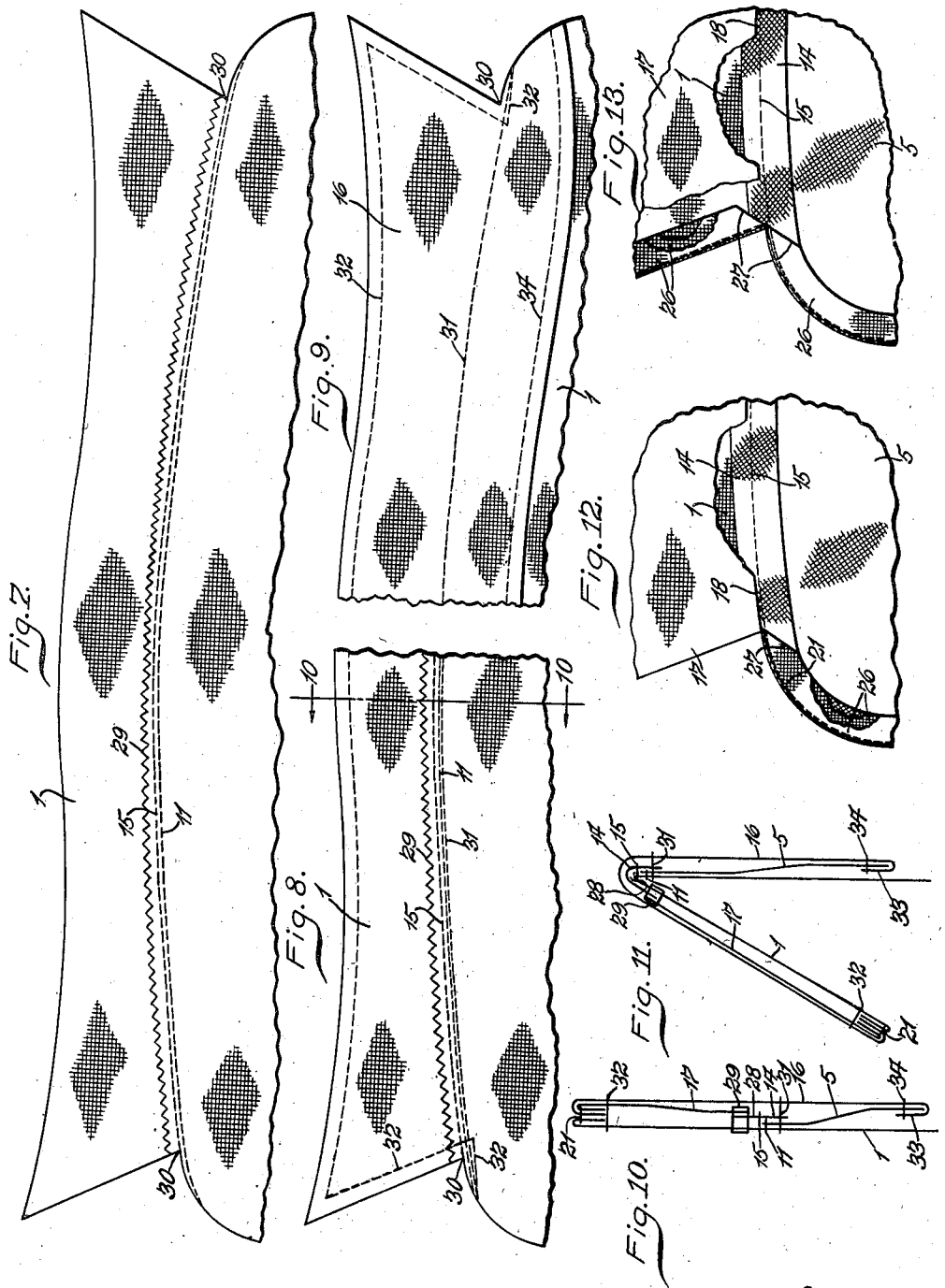

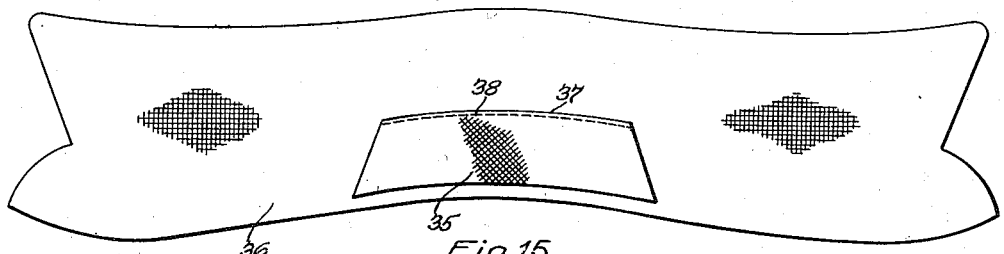
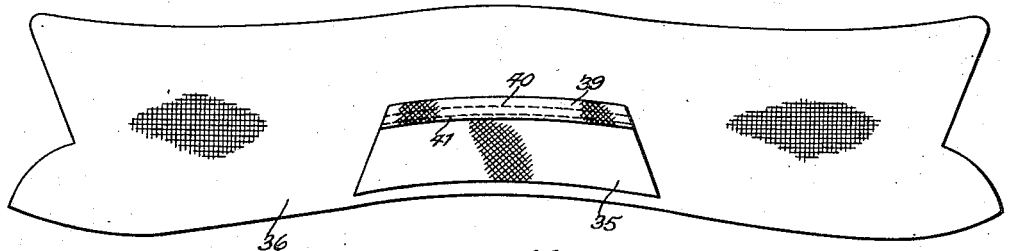
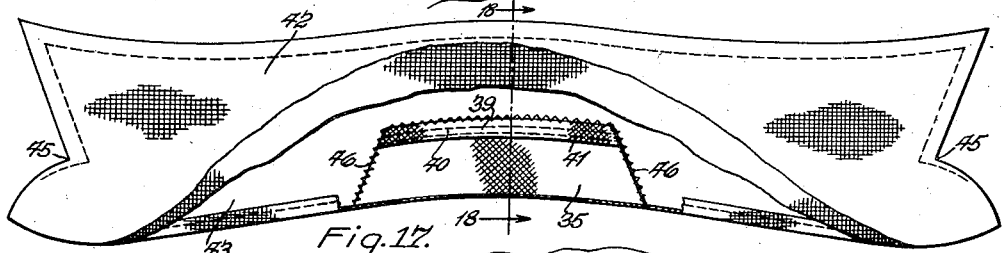
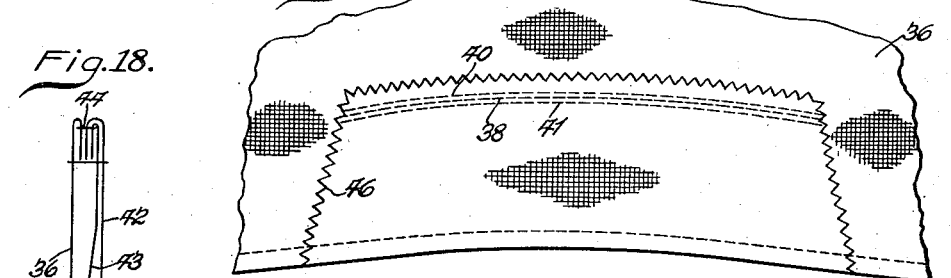
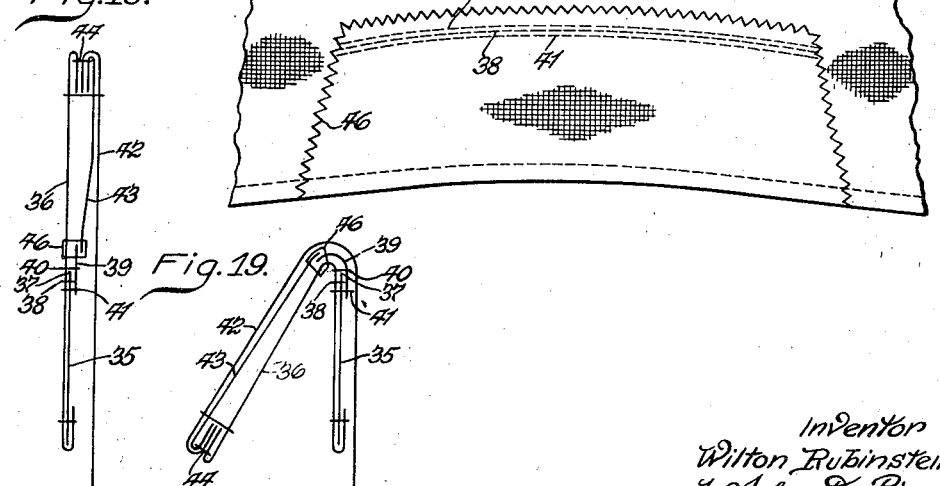
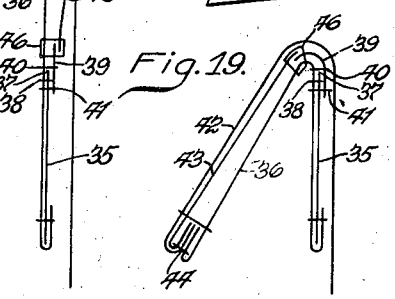

2,286,510

UNITED STATES PATENT OFFICE 2,286,510

COLLAR AND METHOD OF MAKING THE SAME

Wilton Rubinstein, Clayton, Mo., assignor, by direct and mesne assignments, of one-half to Edward Greensfelder and Mercantile-Commerce Bank and Trust Company, trustees under the will of Wilton Rubinstein, deceased, and one-half to Edward Greensfelder and Mercantile-Commerce Bank and Trust Company, trustees for Blanche Rubinstein, Louise Rubinstein, Ann Rubinstein, and Peggy Rubinstein Application September 29, 1939, Serial No. 297,116

12 Claims. (Cl. 2—131)

This invention relates to collars and the method of making the same.

Objects of the invention are to provide an improved turned down collar for shirts having the inturned and concealed margins of the infold and exposed plies at the ends of the collar extended inwardly at one side of the lining section for the cape and at the opposite side of the separate lining section for the band of the collar, and having a novel formation opposite the reentrant notches at the ends of the collar and near the ends of the fold line of the collar in order to obtain a more perfect finish, prevent rolling or folding of the margins of said corners, and prevent the inturned margins and the attaching stitches and adjacent parts from being subjected to continuing and undesired strains and stresses after the collar is finished; and to provide a construction and arrangement at the opposite ends of the fold line of the collar and substantially between the upper edges of the lining sections for the cape and the band preventing the inturned margins of the exposed and infold plies from becoming thickened or rolled across the ends of the fold line.

Another object of the invention is to provide an improved method for making a collar embodying the features above mentioned, consisting in providing means in connection with the concealed side of the infold ply of the collar for accurately locating the band lining section upon said infold ply in position in which the upper curved edge of said lining section will cooperate with other features to define and form one longitudinal side of the fold line of the finished collar; attaching the band lining section to the infold ply in said location by a curved line of stitches adjacent to its curved ends and upper edge; attaching a strip of relatively thin and pliable textile material having its threads extending on the bias to the infold ply of the collar by a curved line of stitches extending through said strip and infold ply along or adjacent to but not through the upper edge of the band lining section in a relationship in which the upper margin of the band lining section is between said strip and the infold ply; attaching the margins of the exposed ply and cape lining section to the infold ply along their end and lower margins and additionally strengthening the attachment of said plies and lining sections opposite the reentrant notches at the ends of the collar, in a manner to hold the cape lining section in a relationship in which its upper edge cooperates with attaching means to form the opposite side of the fold line of the collar from the upper edge of the band lining section; and cutting or forming the extended margins of the infold and exposed plies at the ends of the fold line in a manner preventing the inturned margins of the exposed and infold plies from becoming thickened or rolled across the ends of the fold line.

Another object of the invention is to provide an improved turned down collar having a clearly defined and formed curved longitudinal fold line terminating adjacent to the reentrant notches at the ends of the collar, and improved structural formation securing the parts together at the ends of the collar and positively preventing deformation of the inturned margins of the exposed and infold plies, and also preventing said parts from being subjected to undue stresses in the finished collar.

Another object of the invention is to provide improved means in connection with the infold ply of the collar assisting in correctly locating and placing the band lining section on the exposed side of said ply for attachment thereto.

Another object is to adapt the invention to different types of turned down collars such, for instance, as sports collars, to retain them in better form and shape when worn by supporting the rear portions thereof to prevent undesired rolling or de-formation of the rear portions of the collars while they are being worn.

Various other objects and advantages of the invention will be readily apparent from the following description, reference being made to the annexed drawings, in which—

Fig. 1 is a plan view of the concealed side of the infold ply having the band lining section attached thereto and showing means in connection with said infold ply whereby the band lining section is accurately located thereon.

Fig. 2 is a similar plan view of the concealed side of the infold ply showing the bias strip attached thereto in a manner to cross the longitudinal fold line of the collar.

Fig. 3 is a plan view with parts broken away showing the concealed side of the exposed ply of the collar, the cape lining section thereon, and the relationship of the bias strip and the adjacent edges of the lining sections before the collar is turned rightside out, and also showing the improved attaching means opposite the reentrant notches at the ends of the collar.

Fig. 4 is a plan view showing the concealed side of the infold ply of the collar, as in Fig. 2, but after the parts of the collar have been attached together as in Fig. 3 and after the extended margins at the ends of the fold line and at the corners of the reentrant notches have been conditioned for the purposes of the invention.

Fig. 5 is a plan view of the infold ply of the collar with parts broken away after the collar has been turned rightside out and before the upper edge of the cape lining section has been attached to the bias strip and to the infold ply.

Fig. 6 is a plan view of the collar having the exposed ply rolled away showing the zigzag attaching stitches securing the upper edge of the cape lining section to the overlapped margin of the bias strip and to the infold ply.

Fig. 7 is a plan view of the exposed side of the infold ply of the collar after the line of zigzag attaching stitches have been formed as in Fig. 6.

Fig. 8 is a plan view of the infold side of one end of the finished collar.

Fig. 9 is a plan view of the opposite end of the exposed ply of the finished collar.

Fig. 10 is an enlarged diagrammatic sectional view on the line 10—10 of Fig. 8, showing the cape and band extended in unfolded relationship.

Fig. 11 is a similar sectional view showing the cape partly folded toward the band.

Fig. 12 is an enlarged view of a portion of one end of the collar showing the arrangement of the inturned margins of the plies in the band.

Fig. 13 is a similar view with parts broken away to show the complete arrangement of the inturned margins of the collar plies at the ends of the fold line.

Fig. 14 is a plan view of the concealed side of the infold ply of a sports collar having the special lining section attached thereto.

Fig. 15 is a similar plan view of the infold ply after the bias strip has been attached thereto in cooperative relation with the special lining section.

Fig. 16 is a plan view of the collar having the exposed ply adjusted to show the zigzag stitches securing the margins of the cutout portion of the principal lining section of the collar to the overlapped margin of the special lining section and the bias strip.

Fig. 17 is an enlarged plan view of the exposed side of the infold ply of the collar after the parts have been attached as in Fig. 16.

Fig. 18 is an enlarged diagrammatic sectional view on the line 18—18 of Fig. 16 showing the cape and band extended in unfolded relationship.

Fig. 19 is a similar sectional view showing the cape partly folded toward the band.

The exposed and infold plies and the band and cape lining sections of the collars are preferably cut by clicker dies so that all of the plies of all collars of the respective sizes of collars are of uniform size and area, and all band lining sections for the respective sizes of collars are of uniform size and shape, as are all cape lining sections for collars of the respective sizes. Use of clicker dies for cutting these parts of the collars affords accuracy, facility and speed, and avoids possibility of error and irregularity in the shape and dimensions of the parts incident to cutting of the parts by use of knives or the like. By use of clicker dies, a large number of collar plies or band lining sections or cape lining sections may be cut at a single operation, and simultaneously with the cutting thereof, the various parts may be equipped or characterized with means guiding and facilitating the association therewith of other parts to be attached thereto. Specifically, such means may consist of perforations through indentations upon, or other visible changes in or upon, the surfaces of the plies to function as guides or locating means for edges of the lining sections superimposed on said plies for attachment thereto. In the case of the lining sections, the edges thereof may be formed with indentations or cutouts to cooperate with means formed upon the plies to assist in locating and placing the lining sections upon the plies preparatory for attachment thereof.

According to the present invention, the exposed side of the infold ply 1 is formed with two indentations, perforations, or other surface irregularities, 2 and 3 adjacent to the ends of the band portion of said ply, and a curved series of indentations, perforations, or other surface irregularities 4, the same constituting means facilitating and expediting the placing and locating of the band lining section 5 on the concealed side of the ply 1. An additional visible irregularity 6 on the concealed side of the infold ply 1 is provided for cooperation with a notch or cutout 7 in the lower edge of the band lining section 5. The point 6 is approximately midway between the points 2 and 3 on the infold ply, and the point 7 is midway between the two points or corners 9 of the band lining section 5.

The upper edge 8 of the band lining section 5 is curved and cooperates with lines of attaching stitches to define and form one side of the longitudinal curved fold line of the collar.

The band lining section 5 is placed upon the concealed side of the infold ply 1 by locating the corners 9 of said ply at the visible guides 2 and 3, the lower curved edge 10 of the band lining section at and along the curved row of guides 4, and the notch 7 exactly opposite the guide 6. All of these formations cooperate to assist the operative in speedily locating and placing the band lining section upon the infold ply. When the corners or points 9 of the band lining section 5 are at the guides 2 and 3, the lower edge 10 along the curved line of guides 4, and the notch 7 opposite the guide 6, the band lining section is in proper location for attachment. Then a curved line of stitches 11 is formed along the upper margin of the band lining section and through the infold ply attaching these parts together, as shown in Fig. 1. When the band lining section and infold ply are thus attached, the end margins 12 of the band of the infold ply remain extended beyond the band lining section and the reentrant notches 13 are spaced from the edge 8 of the band lining section by the width of the margins 12.

Next, a strip 14 of relatively thin and textile material which is cut on the bias so that the threads thereof extend diagonally across the same, is superimposed upon the concealed side of the infold ply 1 having its upper edge approximately at the corners of the notches 13 and its lower margin substantially overlapping the upper margin of the band lining section 5. This strip which in its original form is straight may be curved as shown in Fig. 2 without forming visible creases or wrinkles, and attached to the infold ply 1 by a curved line of stitches 15 passing through said strip and said ply very close to, but preferably not through, the upper edge of the band lining section 5. Thus, the upper edge 8 of the band lining section 5 and the parallel curved lines of stitches 11 and 15 cooperate to form one side of the curved fold line of the collar.

After the band lining section 5 and the bias strip 14 have been attached to the concealed side of the infold ply 1 by the lines of stitches 11 and 15 respectively, the exposed ply 16 is superimposed upon the infold ply and the cape lining section 17 upon the ply 16. The cape lining section 17 is formed with two cuts or slits 17′ extending upwardly from its lower edge to prevent wrinkling of the margin of the lining section after the parts have been attached together and the collar is turned rightside out. By preventing wrinkling of the lower margin of the cape lining section along the curves or turns at the shoulders of the wearer, a smooth formation is assured. This is because the slits 17′ substantially prevent the formation of wrinkles or folds along the margin of the cape lining section.

In this arrangement, the surfaces of the plies 1 and 16, which are outside or exposed after the collar is finished, are toward each other. The exposed ply 16 of the collar has its edges even with the edges of the infold ply 1, and the end and lower edges of the cape lining section 17 are even with the end and lower edges of said two plies 1 and 16. The upper edge 18 of the cape lining section 17 is curved complementarily to the curvature of the upper edge 8 of the band lining section. The upper corners of the cape lining section 17 are removed or cut away along lines 19 which intersect the end edges of said lining section 17 and the ends of the exposed and infold plies of the collar below the corners of the reentrant notches 13, thereby providing an arrangement preventing rolling or thickening of the different layers and plies of material adjacent to said corners 13 or at the ends of the fold line of the collar when the collar is finished. Also, the lower corners of the cape lining section 17 are cut away or removed along lines 20 to reduce the thickness or number of plies and prevent rolling or objectionably folding of the plies at the corners when the collar is turned rightside out and finished.

After the cape lining section 17 and the exposed ply 16 have been superimposed one upon the other, and the exposed ply 16 upon the infold ply 1 in the manner described, the parts are attached together by a line or lines of stitches 21 extending along the end margins of the collar and lower margin of the cape, through the end margins of the band portions of the exposed and infold plies, through the end portions of the margins of said plies and of the cape lining section 17 to points beyond the edges 29 of the cape lining section, and thence through the lower margins of said two plies and of the cape lining section 17. The lines of stitches 21 are formed through the band portions of the collar to the points 22 near the band side of the fold line and approximately at the lines of stitches 11 and 15, and the edge 8 of the band lining section (Fig. 4). The line of stitches is extended from the points 22 to the points 23, or vice versa, and then a second line of stitches 24 is formed between said points 22 and 23, leaving or providing a connecting thread 25 between said points 22 and 23, in addition to the two lines of stitches mentioned. Between the points 23, the single line of stitches 21 is formed.

After the parts of the collar have been attached in this manner and the angle points or corners 22 of the line of stitches 21 have been formed near or within the fold line and opposite the corners 13, the marginal portions 26 of the infold and exposed plies and the overlapping portion of the strip 14 are provided with slits or cuts 27 extending from the corners 13 toward the corners 22 of the lines of stitches 22 and 24 but terminating a short distance from the lines of stitches 22, 15 and 11.

Next, the collar is turned rightside out, the infold and exposed plies and the lining section 17 being held together by the line of stitches 21 extending along the margins of said parts and by the line of stitches 24 through the end margins of said parts and crossing the upper edge 18 of the cape lining section 17. When the collar is turned rightside out, the curved upper edges 11 and 18 of the lining sections 5 and 17, respectively, are parallel and are separated by a curved linefold space 28 through and across which the strip 14 extends. The upper margin of the cape lining section 17 slightly overlaps the cape margin of the strip 14, and a curved zigzag line of stitches 29 is formed through the strip 14 and the infold ply 1 along the edge of, but not through, the cape lining section 17, and also through the cape lining section 17 and the infold ply 1 downwardly beyond the edge of said lining section 17. In this manner, the zigzag line of stitches 29 crosses the edge of the cape lining section 17 and extends along the marginal portion of said lining section, and also through said lining section, thereby attaching a marginal portion of the lining section 17 to the infold ply 1 and to the strip 14. This line of stitches 29 cooperates with the edge of the lining section 17 to form and define one side of the longitudinal curved fold line 28, and also prevents raveling of the upper edge of the lining section 17. The opposite side of the longitudinal fold line 28 is defined and formed by the upper edge of the band lining section 5 and the cooperation therewith of the parallel lines of stitches 11 and 15, which are very close together.

When the collar is turned rightside out, the margins 26 of the exposed and infold plies in the band portion of the collar below the cuts or slits 27 are extended between the exposed ply 16 and the band lining section 5; and, in the cape portion of the collar, the end margins 26 of said plies are extended between the infold ply 1 and the cape lining section 17 below the cuts or slits 27. Thus, the inwardly extended margins 26 are at one side of the band lining section 5 and at the opposite side of the cape lining section 17 in the finished collar. A proper finish is obtained at the corners 30 formed at the union of the band and the cape in the completed collar, and rolling or undue stressing or tearing of the margins 26 is prevented, because the edges of the cuts or slits 27 are flared apart, as shown in Fig. 13, without in any way weakening the connections at their corners.

After the zigzag line of stitches 29 has been formed, a quilting line of stitches 31 is formed along the band through the ply 1, band lining section 5, strip 14, and exposed ply 16 adjacent to the line of stitches 11, but entirely concealed within the band. A line of footstitching 32 is formed along the end and lower margins of the cape through the infold ply 1 and exposed ply 16 and the interposed cape lining section 17. This line of stitches 32 crosses the fold line of the collar which extends the full length of the collar between the lines of stitches 15 and 29 (Figs. 7 and 8). After crossing the fold line of the collar and entering the upper margin of the band lining section, the line of stitches 32 is extended at each end outwardly to the end of the collar band.

In this finished collar, the lower edge 33 of the band portion of the exposed ply 16 of the collar is folded to enclose the lower margin of the band lining section 5, and a line of stitching 34 is formed through the margin 33, the band lining section 5, and the exposed ply 16 to finish this portion of the collar.

As shown in Fig. 14, a special lining section 35 is attached to the concealed side of the band portion of the infold ply 36 of a sports collar or other collar in which, for any reason, it is desired to provide a clearly defined fold line at the rear of the collar only. In this construction of collar, the fold line does not extend continuously throughout the length of the collar. The special lining section 35 is preferably characterized by a degree of stiffness that will prevent the rear of the collar from rolling or becoming disarranged in any form or shape that is not pleasing when the collar is worn. This special section 35 is formed with an upper curved edge 37 which cooperates with other parts attached to the infold ply to form a defined fold line along the rear portion of the collar and terminating substantially inwardly from the ends of the collar. Beyond the ends of the section 35 the collar is relatively soft and may roll to different forms or shapes. A curved line of stitches 38 extends from end to end of the special lining section 35 along the upper margin thereof and quite close to the curved edge 37 and passes through the section 35 and the infold ply 36.

A strip 39 of the same quality as the strip 14 and similarly formed overlaps the upper margin of the band lining section 35. In its original form, this strip is straight and may be curved without forming visible creases or wrinkles and attached to the infold ply and to the lining section 35 by parallel curved lines of stitches 40 and 41. The line of stitches 40 passes through the strip 39 and the infold ply 36 along and preferably against but not through the section 35. These lines of stitches 38, 40 and 41 cooperate directly with each other and with the edge of the lining section 35 to form one curved side of a curved fold line for the rear portion of the collar. The section 35 is of textile stiffening material preferably cut on the bias so that all of its threads intersect the upper edge 37, with the exception of the few threads that intersect the ends and lower edges only of said section. The line of stitches 38 crossing all of the threads along the upper margin of the section 35, in cooperation with the strip 39 and the lines of stitches 40 and 41, prevents raveling of the upper edge of the section 35 in addition to forming one side of the fold line.

After the band lining section 35 and the bias strip 39 have been attached to the concealed side of the infold ply 36 by the lines of stitches 38, and 40 and 41, respectively, the exposed ply 42 is superimposed upon the infold ply 36, and the principal lining section 43 is superimposed upon the exposed ply, and said parts are attached together along their end margin and along the lower margins of the cape by a line of stitches 44 analogous to the line of stitches 21. The end edges and the edges along the lower cape portions of the plies 36 and 42 and of the principal lining section 43 are even, so that the stitches 44 pass through all of said parts along the ends of the collar and lower margin of the cape. This operation is analogous to that already described in which the cape lining section 17 is attached to the plies 1 and 16 by the marginal line of stitches 21. Slits or cuts similar to the cuts 27 and in the same relationship are preferably formed at the ends of the collar so that, when the collar is turned rightside out and the margins of the plies 36 and 42 and of the principal lining section 43 are extended inwardly and concealed, the corners 45 will be formed like the corners of the collar above described.

The principal lining section 43 is formed with a cutout portion of a shape similar to the lining section 35. The area of the cutout is such that the margins thereof slightly overlap the end margins of the cape lining section 35, and that margin of the strip 39 that extends beyond the fold line of the collar downwardly into the cape. A zigzag line of stitches 46 is then formed along the edges of the cutout in the principal lining section 43. These stitches pass through the lining section 35 and through the strip 39 and the infold ply of the collar along the edge of but not through the lining section 43, and the opposite sides of said stitches pass through the lining section 43 and the infold ply 36 adjacent the edges of but not through the lining section 35 and the strip 39. In this manner, the zigzag line of stitches 46 crosses the edge of the band lining section 35 and the cape margin of the strip 39, and also extends through the lining section 35 and through the strip 39, thereby attaching a marginal portion of the lining section 43 around the cutout to the lining section 35, the strip 30 and the infold ply. This line of zigzag stitches cooperates with the edge 37 of the band lining section 35 and with the lines of stitches 38, 40 and 41 to form and define a definitely located fold line at the rear portion of the collar only, leaving the end portions beyond the lining section 35 soft and pliable and free to roll.

It should now be apparent that my invention provides a highly improved and refined turned down collar in which the parts are assembled in exact cooperative relationship to form and define a curved fold line between the upper edges of the band and cape lining sections. In this collar, the upper edge of the cape lining section 17 is at the beginning of the roll or turn of the collar at one side of the fold line, and does not produce any noticeable contrast in the finished appearance. The relationship of the concealed or confined portions of the collar at or adjacent to the ends of the fold line and at the corners 30 of the finished collar prevents rolling or doubling upon themselves of the inturned margins, and also prevents tearing or breaking of these margins when the collar is turned rightside out and extended or stretched into finished form.

Collars embodying features of this invention may be applied to different types of garments. For convenience, I have shown the invention embodied in collars for two types of garments. I am aware that collars embodying the invention as shown in Figs. 14 to 19 may be used on garments other than shirts, such, for instance, as coats, jackets, and different kinds of uniforms. I contemplate such variations in the arrangement of the parts and in the order of their assembly as may be needed to adapt the invention for its intended uses.

I claim:

1. A turned down collar comprising exposed and infold plies having reentrant notches at their ends near the connection of the band and the cape, a line of stitches attaching said plies together near their ends and near the lower edges of the cape portions thereof and forming angles complementary to said notches, the margins of said plies between their edges and said lines of stitches extending inwardly between said plies and having cuts extending from the corners of said notches toward and terminating a short distance from said line of stitches, band and cape lining sections confined between said plies and having curved upper edges separated by an intervening longitudinal fold line space terminating at said cuts at opposite ends of said collar and having their ends extending at relatively opposite sides of said margins at the ends of the collar, and parallel lines of stitches attaching the upper edges of said lining sections to said infold ply and cooperating with said edges of said lining sections to define and form said fold line space from one of said cuts to the other.

2. The method of making a turned down collar comprising infold and exposed plies having reentrant notches at their ends near the connection of the band and the cape, consisting in separately attaching band and cape lining sections to said infold and exposed plies respectively, and attaching said plies together simultaneously with the attachment of said cape lining section; cutting the margins of said plies inwardly from the corners of said notches; turning the plies to confine said lining sections between them and simultaneously extending the end margins of said plies inwardly at relatively opposite sides of the ends of said lining sections; and finishing the collar.

3. The method of making a turned down collar having infold and exposed plies provided with reentrant notches at their ends near the connection of the band and the cape, consisting in separately attaching band and cape lining sections to said infold and exposed plies respectively to provide a longitudinal fold line space between their upper edges, and attaching said plies together simultaneously with the attachment of said cape lining section; cutting the margins of said plies from the corners of said notches toward the lines of attachment; turning the plies to confine said lining sections between them to form said longitudinal fold line space between their upper edges and simultaneously extending the end margins of said plies inwardly at relatively opposite sides of the ends of said lining sections in a relationship in which said cuts are at the ends of said fold line; permanently attaching the upper edge of said cape lining section to said infold ply to form and define one longitudinal side of said fold line; and finishing the collar.

4. A turned down collar comprising exposed and infold plies having reentrant notches at their ends near the connection of the band and the cape, a line of stitches attaching said plies together near their ends and near the lower edges of the cape portions thereof and forming angles complementary to said notches, band and cape lining sections confined between said plies and having curved upper edges separated by an intervening longitudinal fold line space, the margins of the cape portions of said plies extending inwardly between said cape lining section and said infold ply and the end margins of the band portions of said plies extending inwardly between said band lining section and said exposed ply, said margins having cuts extending inwardly from the corners of said notches toward and terminating short of said line of stitches, and parallel lines of stitches attaching the upper edges of said lining sections to said infold ply in spaced relationship and cooperating with said edges of said lining sections to define and form a longitudinal fold line space from one of said cuts to the other.

5. A turned down collar comprising exposed and infold plies extending the full length and width of the collar having reentrant notches at their ends and having their end margins confined at their ends and having their end margins confined between said plies and cut from the corners of said notches to their edges and spread apart along said cuts, a section of lining material attached to the concealed side of the infold ply and having its upper edge extending along the fold line of the collar and having its ends terminating substantial distances from the ends of the collar and leaving the end portions of the collar beyond said lining section free to roll, a principal lining section secured between said infold and exposed plies and extending substantially the full length and width of the collar and having a cutout portion approximately equal in length and of slightly greater width than said lining section, and means attaching the edges of said principal lining section to said first lining section and to said infold ply at the ends of said cutout and attaching the inner edge of said cutout to said infold ply beyond the upper edge of said first lining section and cooperating therewith to form a curved fold line terminating substantial distances from the ends of the collar.

6. In a turned down collar having reentrant notches at its ends and including an exposed ply, and an infold ply extending the full length and width of the collar and forming a band and a cape and having their end margins confined between said plies and cut from the corners of said notches to their edges and spread apart along said cuts; a strip extending longitudinally of the collar along the concealed side of said infold ply and extending a short distance into the band and the cape respectively, lining sections in the band and cape respectively having their adjacent margins overlapping opposite sides of said strip and having their adjacent edges separated by a narrow longitudinal curved fold line space, and parallel lines of stitches passing through the adjacent margins of said lining sections and through said strip and through only the infold ply of said two plies and holding said lining sections and said strip from relative displacement with respect to said infold ply and cooperating with said lining sections to form a defined longitudinal fold line for the collar.

7. In a foldable article of apparel having reentrant notches at its ends and including an exposed ply, and an infold ply extending the full length and width of the article and having their end margins confined between said plies and cut from the corners of said notches to their edges and spread apart along said cuts; a strip extending longitudinally of the article and having a width greater than the fold line, two lining sections for the article having their adjacent margins overlapping opposite sides of the margins of said strip and their adjacent edges separated by a longitudinal curved space of uniform width along said strip, parallel lines of stitches passing through the adjacent margins of said lining sections and through said strip and through only the infold ply of said two plies and holding said lining sections and said strip and said infold ply from relative displacement and leaving said exposed ply unattached thereby, and a line of stitches attaching said exposed ply to said lining sections and to said infold ply and said strip adjacent to the margins of said plies.

8. In a turned down collar having reentrant notches at its ends and including an exposed ply, and an infold ply extending the full length and width of the collar and forming a band and a cape and having their end margins confined between said plies and cut from the corners of said notches to their edges and spread apart along said cuts; a strip extending longitudinally of the collar along the concealed side of said infold ply and extending a short distance into the band and cape respectively, two parallel lines of stitches attaching the margins of said strip to the band and cape portions of the infold ply only of said two plies, lining sections in the band and cape overlapping the margins of said strip and engaged by said lines of stitches and having their adjacent edges separated by a narrow longitudinal fold line space of uniform width, parallel lines of stitches passing through the adjacent margins of said sections and through said strip and infold ply only and between said first named lines of stitches and holding said sections and said strip and infold ply from relative displacement, and a line of stitches passing through both of said plies and through the band lining section and said strip downwardly beyond said fold line within the band portion of the collar.

9. A garment comprising a collar adapted to be folded and creased along an intermediate longitudinal line to provide an inner and an outer collar section, the collar being made up of an exposed ply and an infold ply superimposed one on the other, a pair of lining sections in the collar, one of said lining sections being wholly in said inner section and the other extending the full length of the outer section and both being between the exposed ply and the infold ply of the collar, said lining sections in the flat position of the collar having their adjacent longitudinal edges defining and bordering a symmetrically curved fold line and their margins immediately adjoining said edges stitched to said infold ply only, and lines of stitches wholly covered and concealed by said exposed ply attaching the adjacent edges of said lining sections to said infold ply and leaving said adjacent edges unattached to said exposed ply of the collar.

10. A garment comprising a collar adapted to be folded and creased along an intermediate longitudinal line to provide an inner and an outer collar section, the collar being made up of an exposed ply and an infold ply superimposed one on the other, and a pair of lining sections in the collar, one in said inner section and the other extending the full length of the outer section and both being between the exposed ply and the infold ply, said lining sections in the flat position of the collar having their adjacent longitudinal edges defining and bordering a symmetrically curved fold line and their margins immediately adjoining said edges stitched to said infold ply only, and a strip extending between said edges and overlapping opposite sides of the adjacent margins of said lining sections.

11. A turned down collar comprising pliable exposed and infold plies forming a band and a cape, a cape lining section extending approximately the full length of the collar attached to the concealed side of the infold ply, and a lining section of relatively much less length than said cape lining section attached to the concealed side of the band and extending along the rear portion only thereof and leaving the side and end portions of the band of the collar beyond the ends of said second lining section free to roll and preventing relative rolling of the cape and band portions of the collar only at the rear thereof, said lining sections having their adjacent edges separated by an intervening space and cooperating to form a defined longitudinal fold line of the collar extending the length of said second lining section only.

12. A turned down collar comprising pliable superimposed exposed and infold plies forming a band and a cape, a band lining section of relatively much less length than either of said plies extending along the rear portion only thereof and preventing relative rolling of the cape and band portions of the collar only at the rear and leaving the side and end portions of the band of the collar beyond the ends of said lining section free to roll, a cape lining section confined between said plies and having its upper edge close to and spaced from the upper edge of said band lining section throughout the length of and cooperating with said band lining section to form a defined fold line along the upper edge of said band lining section only, and lines of stitches, covered and concealed by said exposed ply, attaching the adjacent edges of said lining sections to said infold ply only and leaving said edges unattached to said exposed ply.

WILTON RUBINSTEIN.